US008974565B2

(12) United States Patent
Cecchi et al.

(10) Patent No.: US 8,974,565 B2
(45) Date of Patent: Mar. 10, 2015

(54) AIR FILTRATION AND AIR PURIFICATION APPARATUS (76) Inventors: Michael Cecchi, Madison, CT (US); Monica Mezezi, Guelph (CA)

( * ) Notice: Subject to any disclaimer, the term of this patent is extended or adjusted under 35 U.S.C. 154(b) by 465 days.

(21) Appl. No.: 13/225,511

(22) Filed: Sep. 5, 2011

(65) Prior Publication Data

US 2013/0055692 A1  Mar. 7, 2013

(51) Int. Cl.
 *B01D 46/00* (2006.01)
 *B01D 46/42* (2006.01)
 *B01D 46/10* (2006.01)
(52) U.S. Cl.
 CPC .............. *B01D 46/42* (2013.01); *B01D 46/10* (2013.01)
 USPC .............. 55/350.1; 55/342; 55/344; 55/470; 55/472; 55/473; 55/482; 55/484; 96/424
(58) Field of Classification Search
 USPC ........ 55/342, 343, 344, 350.1, 470, 472, 473, 55/482, 484; 95/26, 286; 96/424
 See application file for complete search history.

(56) References Cited

U.S. PATENT DOCUMENTS 7,163,567 B2 * 1/2007 Choi .............................. 55/312

* cited by examiner

*Primary Examiner* — Robert Clemente
(74) *Attorney, Agent, or Firm* — Michael A. Blake (57) ABSTRACT An air filtration and air purification apparatus comprising: a first air channel; a second air channel; a divider that separates the first air channel from the second air channel; a first filter located in first air channel; a first filter located in the second air channel; a first air blower configured to pull air from the ambient environment generally into the first air channel, moving said air through the first filter, and returning said air into the ambient environment, creating generally a first air stream; a second air blower configured to pull air from the ambient environment generally into the second air channel, moving said air through the second filter and returning said air into the ambient environment, creating generally a second air stream; a control system that controls the activation and deactivation of the first and second air blower.

12 Claims, 9 Drawing Sheets

AIR FILTRATION AND AIR PURIFICATION APPARATUS

TECHNICAL FIELD

This invention relates to an air filtration and air purification device apparatus, and more specifically to an air filtration and air purification apparatus that provides two levels of air filtering to a volume of air.

BACKGROUND

Currently, there are many methods to clean the air of a room or an environment. Conventional methods include known filtering units which reside inside the room environment and fitters the air. These known filtering units may be permanent or portable and will fitter the air of a room or area, filter the air continually as they operate, drawing the air into the unit, filtering the air and then returning it to this same environment.

Some of these systems may be less effective due to having to use filters, which may not be of the needed or desired level of filtration due to the amount of airflow restriction caused by the filters. Many known filtering systems are not equipped with a sufficient filter, such as a HEPA (High Efficiency Particulate Air) grade filter. HEPA filters can be rated to remove 99.97% of all particles more than 0.03 microns. The problem facing the use of these HEPA filters, such as a H17 class filter, is that they can restrict the airflow, which passes through the fitter. This restriction creates a backup and limits the amount of air a known air filtration system may be able to filter. In addition, the amount of air that passes through a HEPA FILTER, such as a class H17 filter, means that the amount of air that can be filtered in a certain time period, such as a minute or hour, is severely reduced. These systems will require powerful blowers or motors to move the air through HEPA filtered, rated H17, and therefore would use more electricity and may not be as efficient as would be desired.

Some other problems with known air filtration systems are their inability to utilize carbon or other ingredients within the filters, due to the drop in pressure such ingredients may create and the inadequacy of the motors driving the blowers to push air sufficiently through the filters. Therefore many of these known air filtration systems compromise the quality of the filtered air for the desired air pressure.

There are several problems faced by the known air filtration systems placed inside rooms. Often the small units use small motors or fans, which are not adequate to create enough Air Exchanges per Hour (AEH) to keep the room clean. Sometimes they utilize small motors in order to be quiet and when combined with a HEPA or high MERV rated filter, do not create enough air flow to exchange the air in the room an adequate number of times in a minute or hour to be effective or to create the desired effect and impact. Lack of air movement through the filters also reduces the air velocity in these systems. The reduced air velocity limits the distance the air wilt travel in a directed flow and will reduce the ability of the unit to move air in at a greater distance from the unit. This will prevent smaller units to accommodate larger square foot and cubic foot rooms.

Smaller known air filtration systems lack enough air velocity such that when added to a system, which may include a HEPA filter of 99.97%, the smaller system will drastically decrease the overall air velocity due to its inability to properly exchange the air in the room, or what is referred to as "air exchanges".

Other problems with known air filtration systems relate to the 'CFM' rating of the motor driving a blower. The CAW rating of a motor or fan is the 'Cubic Feet per Minute' that the motor can exchange. For example in a room that is 10 ft×10 ft×8 feet talk or 800 cubic feet, an air filtration system rated at 200 CFM's would change the air in a room, one time every four minute or 15 times per hours or 15 AEH. This simple calculation does not necessarily mean that all the air in the room actually does exchange in that time. Using a smaller CFM motor in conjunction with a HEPA filter will create a resistance and back pressure to the air velocity and therefore may result in the air not being moved at the rated 200 CFM's, but may be decreased to 'an effective' CFM of less than 200 CFM, perhaps 100 CFM, which means that the known air filtration system would only 'exchange' the air, 1 (one) time every 8 (eight) minutes, or 7½ times per hour, as would be expected.

Other problems encountered with known air filtration systems is their inability to exchange the air in a room, at high rates or which is sufficient to maintain a sufficiently clean area for the purpose at hand. There are currently room air purification devices which claim to do, as an example, a 700 sq. ft. room, 77 cu. ft. assuming 8 foot ceiling, but the only exchange the air in the room 4 times an hour, with a filter rated at 10 MERV. At the rate of 4 AEH and a MERV 10 filter, the unit would not be able to keep the room clean, if a few people occupied it Other problems encountered by known air filtration systems is the inability to move the air on the far sides of the room, due the restrictions expressed above, and the lack of velocity of the moving air. The combination of a smaller motor and HEPA filter will reduce the ability for the air to maintain a velocity which will allow it to reach the far corners of the volume or room to be cleaned, and also reduces the creation of turbulence amongst the particulates and contaminants in these further portions of the room or volume.

At present many known air filtration systems on the market today, especially room known air filtration systems, use a single fan/blower or motor to move the air, one set of filters, a single airflow or airstream, and a plenum. If these known air filtration systems use a 99.97% HEPA filter for the removal of particulates from the air, they will be restricted in their performance and will not accomplish expected results, due to the backpressure and limited airflow. For these known air filtration systems to be able to move enough air, manufacturers may use a lesser grade filter such as an 90% filter, or a Merv 8 rating which would only remove much larger particulates, such as 5.0 micron and larger.

Currently, there are individual and industry misconceptions of the methods for cleaning and moving the air within rooms. These misconceptions relate to the relationship between the air exchanges and the grades of the filters. Many believe that in order to be effective a high grade HEPA filter, which may be a 99.97% HEPA filter, which captures up to 0.3-micron particulates.

A third problem facing current known air filtration systems is that to move air through a 99.97% HEPA filter, a powerful motor is required and in most cases the more powerful motors make more noise that is suitable for many environments and require more energy, which will make it more costly to operate. The noise issue is difficult to solve due to minimum CFM requirements to move air through a HEPA filter.

Another problem facing current air filtration systems is that they rely on one set of filters and blowers to clean the desired air environment. This makes these products to rely on the ability of that one filter system to be able to accomplish these goals, and cannot take advantage of utilizing different filter ratings for different purposes. The mixing of filters and blowers wilt allow a greater diversity of use of the invention.

Another problem facing existing air filtration systems is that they only contain one blower and filter system. If these system contain blower is capable of exchanging the air 10 times per hour, then this is there limit. One blower and filter system they can only change the air in relationship to the CFM's of that single system.

It would be highly desirable to provide an air filtration and purification apparatus that overcomes the above listed and other disadvantages.

SUMMARY

The disclosed invention relates to an air filtration and air purification apparatus comprising: an enclosure, the enclosure having a top, a bottom, sides and a rear; a first air channel located in the enclosure; a second air channel located in the enclosure; a divider that separates the first air channel from the second air channel; a first fitter located in first air channel, and in direct fluid communication with the first air channel; a first filter located in the second air channel, and in direct fluid communication with the second air channel; a first air blower configured to pull air from the ambient environment generally into the first air channel, moving said air through the first filter, and returning said air into the ambient environment, creating generally a first air stream; a second air blower configured to pull air from the ambient environment generally into the second air channel, moving said air through the second filter and returning said air into the ambient environment, creating generally a second air stream; a control system that controls the activation and deactivation of the first and second air blower, such that the control system is configured to operate the blowers independently or together.

The invention also relates to a portable air filtration and air purification apparatus comprising: an enclosure, the enclosure having a top, a bottom, and a rear; a first air channel located in the enclosure; a second air channel located in the enclosure; a divider that separates the first air channel from the second air channel; a first fitter in direct fluid communication with the first air channel; a first filter in direct fluid communication with the second air channel; a first air blower configured to pull air from the ambient environment generally into the first air channel, and out through the first filter into the ambient environment, creating generally a first air stream; a second air blower configured to pull air from the ambient environment generally into the second air channel, and through the second filter and then into the ambient environment, creating generally a second air stream; a control system that controls the activation and deactivation of the first and second air blower, such that the control system is configured to operate the blowers independently or together.

In addition, the invention relates to an air filtration and air purification apparatus comprising: an enclosure, the enclosure having a top, a bottom, sides and a rear; a first air channel located in the enclosure; a second air channel located in the enclosure; a divider that separate the first air channel from the second air channel, the divider comprising a rotatable damper, the damper comprising: a first member, the first member configured to rotate to a blocking position, where the first member generally blocks air flow through the first air channel, and the first member configured to rotate to a passing position, where the first member generally allows air to flow through the first air channel; a second member, the second member configured to rotate to a blocking position, where the second member generally blocks air flow through the second air channel, and the second member configured to rotate to a passing position, where the second member generally allows air to flow through the second air channel; a first filter located in direct fluid communication with the first air channel; a first filter located in direct fluid communication with the second air channel; an air blower configured to pull air from the ambient environment generally into the first air channel when the first member is in a passing position, and the second member is in a blocking position, and through the first filter into the ambient environment; the air blower also configured to pull air from the ambient environment generally into the second air channel when the first member is in a blocking position, and the second member is in a passing position, and through the second filter into the ambient environment; a control system that controls the activation and deactivation of the blower, and the position of the first and second members.

Additionally, the invention relates to a portable air filtration and air purification apparatus for filtering and purifying the air in a room, the apparatus comprising: an enclosure, the enclosure having a top, a bottom, and a rear; a means for creating a first air stream leaving the enclosure filtered to remove about 99.975% of all particles that are 0.03 microns or larger; a means for creating a second air stream leaving the enclosure filtered to remove about 95% of all particles that are 5 microns or larger, and where the second air stream has a greater velocity than the first air stream.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

This invention relates to the improvement made to an environmental air purification filtration and air filtration device. The inventions uses unique combinations of blowers, motors and fans and filter combinations, with a designed air flows to more effectively clean the air within an environment.

One embodiment of the inventions is an air purification unit, which will be portable and will be placed within the environment. Additional embodiments may be used in units, which are placed inside the environment, outside the overall environment, such as a rooftop HVAC system, or places along side of the environment to be filtered. This alongside unit may be used to introduce filtered air into the environment or force in clean air from the near outside environment to increase the positive pressure within the desired environment. All devices will draw the air out of the environment, filter it, and the put the clean air back into the chosen area or environment, thereby consistently cleaning and restyling the air.

It should be noted that the terms "blower", "motor", "fan" and "impeller", and the like may be used interchangeably within the descriptions of the functionally or type of air moving source.

Air filters are rated by their ability to collect particulate size particulates. For the sake of comparison, we will use a common rating system referred to as the MERV Rating system. The rating system is based on the sizes of the spaces between the filter fibers, which will allow only certain sized particulates to pass through the filter. See Appendix 3. In this rating system HEPA (HIGH Efficiency Particulate Air) grade filters are rated from 14 to 17. We will be referring to a 99.97% HEPA filter, which will remove all particulates greater than 0.3 microns, this type filter is considered the more common rated filter in use. A lesser grade HEPA such as a 95%, will remove particulates greater than 5.0 microns. We will refer to an ASHRE filter, which is not of a HEPA grade and would be rated from xxx to xxx. We will refer to a MERV 8 rating of these filters, as this is a general rating used in the marketplace. In this table The higher the MERV rating the greater the back pressure is on the air flow, allowing less air flow through the filter and less air velocity. The invention uses a combination of filters, blowers or motors and air channels to clean the air, and the use of multiple systems in the air purification provides separate airflows, air velocities and air exchanges. The use of the same grade filter or different grades of filters will demonstrate the unique qualities of the system.

The higher the MERV rating and in particular a HEPA rating, will require a more powerful blower motor to move the air through the filter, which will require more energy and a greater cost to operate. The use of an ASHRE, will allow a much more efficient more, compared to the one needed for a HEPA. This will decrease the energy use and cost respectively.

One example of the invention is a portable air purification unit, containing a combination of motors and filters, with separate airflows within the portable unit. In this example the device is a self-contained potable air purification unit, such as box. There is a first air system, which has a motor, a HEPA grade filter of 99.97%, within its own air channel, or plenum. There is a second air system, alongside, within the same portable device with its own motor or blower, its own filter and channel or plenum. In this example the second system will contain a lesser grade filter, such as a HEPA filter rated 95% or an ASHRE filter rated MERV 8.

Utilizing two separated air systems, with different filter rating will allow the invention to create separate and more effective airstreams and is able to circulate the more air, by the minute, resulting in significantly more air exchanges and the ability to clean the air quicker and more effectively.

In this example, the first mode of operation is that the first air system uses a 99.97% HEPA Filter which will be turned on and operating, the second air system will include an ASHRE, MERV 8, filter, which will also be operating. They will both be filtering the room at the same time. The first air system will be filtering the air at the rate of a HEPA, or removing all particles greater than 0.3 microns. The second air system will be filtering at a Merv 8 rating, which will filter out particles greater than 10.0 microns.

In this mode the invention will filter out particles greater than 0.3 microns, through the HEPA and smokes and pollens sized particles, greater than 10.0 through the ASHRE.

The unique advantages of this invention is that all the air will eventually be filtered by the HEPA system, as the invention continually filters the air, and be have the increased filtering capacity of both systems.

A second unique advantage is when compared too known system the invention will be able to dramatically increase the air exchanges in the area or environment. Air exchanges are measured by the amount Air Exchanges per Hour (AEH). To illustrate this we will use a blower motor in the first air stream with a CFM rating of 600 MA's, with the filters in place, and an impeller motor with a CFM rating of 400 CFM's with the filters in place, in the second airstream. For this example we will assume a known air purification unit is rated 500 CFM's, with filters in place. Using a room size of 20 feet, by 20 feet, by 8 feet in height, the room would be 3,200 cubic feet. The known unit can perform 9 Air Exchanges per Hour (AEH) exchange the air. The invention with both blower and impeller filter systems running at the same time will produce 1100 CFM's. The invention will exchange the air 20 AEH. This difference will increase the ability of the invention to exchange more than per hour than any known unit, will clean the air in less time and will ultimate clean the air more times which will keep the working environment more stable.

A second unique advantage of the inventions is, by combining these use of the two airstream the invention will be able to circulate and purify the air in further sections of the desired space. This is due to the fact that higher the MERV rating is of a filter, such as a 14 for a HEPA, the smaller the spaces between fibers, less air can go through the filter creating back pressure and less air velocity will pass through the filter. By using a lesser grade filter, the ASHRE MERV 8 in the second air stream allow more air to pass through the filter with greater air velocity. This will allow the air from the second air stream to reach further into the environment, moving the air and contaminants in those regions and bring the air back to the invention to be filtered. This returning air then is filtered either through the HEPA or ASHRE fitter. As the invention contain separate air stream, there is a strong likelihood that all the air in the environment will be filtered through the HEPA thereby removing all particulates greater than 0.3 microns.

A second mode of operating, will be when only the first air system is running, containing the 99.97% HEPA. During this time all the air being filtered will be filtered through the 99.97 HEPA and therefore all the air will be cleaned of its particulate down to 0.03.

A third mode of operating, will be when only the second air stream will be operating, with the ASHRE, MERV 8, filter. The unique advantages of this mode are many. The fact that the second air system may contain a more efficient motor or blower, as the filter has less backpressure. This more efficient more will use less energy and be less costly to operate. This will also allow the unit to operate at different times, such as in the evenings or overnight, while operating more efficiently it will keep the air clean and maintain a desired level of removing the contaminants and keep the environment air a level of purity without having to shutting the unit off and save energy.

Another unique advantage that the invention is by utilizing two operating systems with each its own filters allowing them to create a HEPA clean environment, white conserving energy. In our example we used a 99.97% HEPA and an ASHRE 8 filter. The filters complement each other, the ASHRE allow the HEPA to have a longer effective life. The tower rated ASHRE fitter will perform as well as the HEPA filter when used in combination. Together they particles up to 0.3 microns, white the ASHRE will catch most smoke, insecticides, duct, face powder, bacteria, mold, lead dust, spores, mites, pet dander, moss, and carpet fibers. While the inventions is able to exchange the air AEH at two to three times the rates of any known unit. Therefore when combined with the 99.97% HEPA, which catches all particulates down to 0.3 microns.

The advantage of the invention is that the systems may be integrated to better perform in light, medium or heavily contaminated environments by using the separate system together or separately and at different speeds and effectiveness. The dual systems may be operating at the same time when the initial installation is made or for the start up of any given day. This will more rapidly clean the air over known air filtration devices.

The invention will include a manual and/or electronic system of controls. The manual or electronic system will consists of turn knobs, on off switches and the electrical system may include a keypad. The manual system and electronic system will control the on and off, the combinations of blowers and motors and the air flow within the device. The system for controlling the motors and when they will be running or not running. This will allow the invention to systematically alter the fans or motors and which motor is running to achieve maximum air quality for the desired environment and conserve energy.

The invention allows the separate use of the motors or blowers and the filter system, which will reduce the electricity used by the invention and accordingly save money for the users.

The invention may have a second embodiment of using separate filters, air channels, plenums and airflow, white using a single motor or fan to create the airflow. This device uses a single fan or motor with a system of deviating the airflow, towards the separate filter or channel or plenums. The device includes a method to alter the airflow through the device and the various filters and filter combinations.

The invention may be made of either a polymer or a metal material or a combination of both. The invention consists of multiple adjoining parts, concisely designed to fit easily together, to create a device for air movement and filtration. The invention may be used in multiple configurations.

The disclosed invention uses a unique combination of blowers/motors, air channels/plenums with specific filter combinations to increase the air exchanges, air disbursement and overall quality of the air in the desired environment versus all known methods. The invention will decrease the airborne particulates, volatile organic compounds (VOC) and, chemical air contaminants (CAC) from the air in the desired environment and will increase the air quality by reducing these contaminants in this desired space. The invention may be used create a cleanroom, such as a Class 10,000 Cleanroom, a clean laboratory, clean workspace and a reduced contaminant environment.

Figure 1:
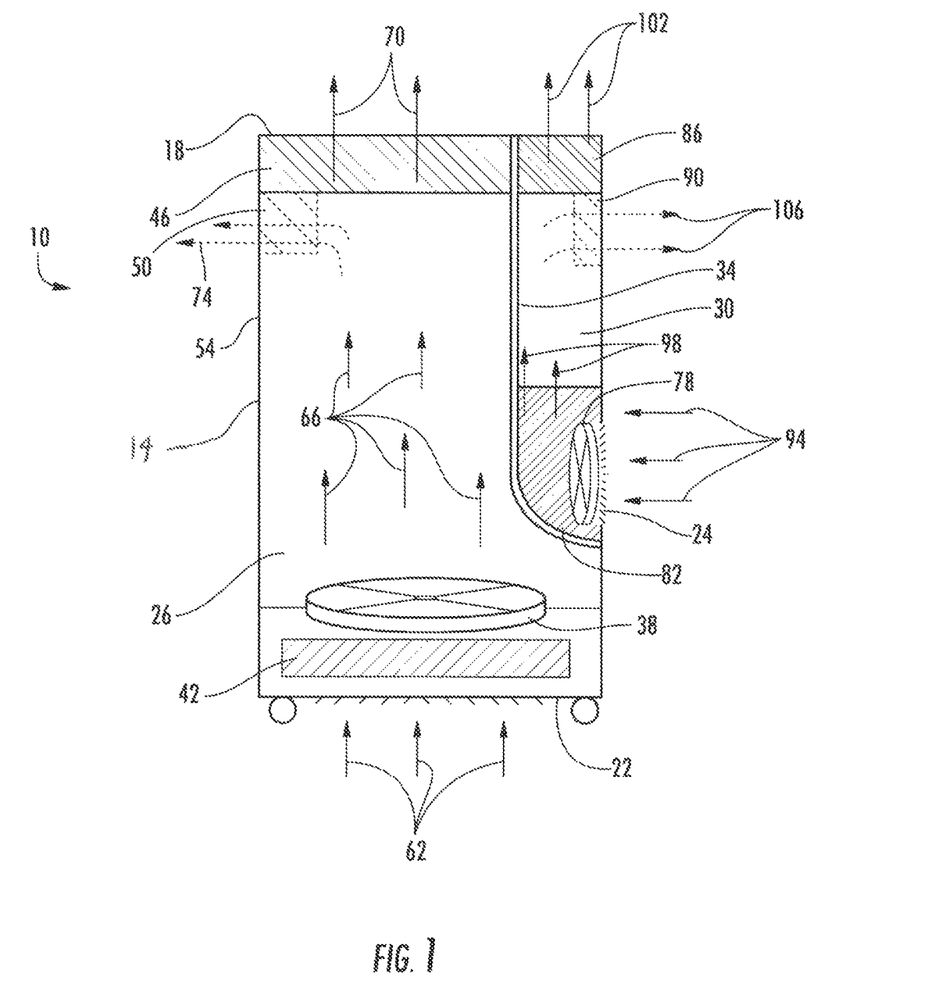
FIG. 1 is a cross-sectional view of one embodiment of the disclosed air filtration and air purification apparatus.

FIG. 1 is a side sectional view the air filtration apparatus 10. The apparatus 10 comprises an enclosure 14. In one embodiment, the enclosure may be a four-sided enclosure, with a top 18, bottom 22, and rear 24. The enclosure may be constructed from any suitable material, including but not limited to a copolymer or metal material. In the disclosed embodiment, apparatus 10 comprises a first air channel (or plenum) 26 and a second air channel (or plenum) 30. The two channels 26, 30 are separated by a divider 34. The first air channel 26 contains a first fan or blower 38 and contains an optional pre-filter 42, and an exit filter 46. Optional side exit filters 50 (shown in dashed lines) may be placed on a sidewall 54 in the first air channel 26. The first fan or blower 38 will draw air from the bottom 22 of the enclosure 14 and tower portion of the enclosure 14. The blower 38 will draw the air, as shown by the arrows 62, and force the air through the first air channel 26, as shown by the arrows 66, and push the air out through the exit filters 46 (and optionally side exit filters 50), as shown by arrows 70 (and optionally arrows 74). The first air channel 26 is in the front of the enclosure 14. The second air channel 30 is in the rear of the enclosure 14. The second air channel 30 is separated from the first channel 26 by the divider 34, thus allowing (or a separate air flow and air path in the second air channel 30. In fluid communication with the second air channel 30 is a second fan or blower 78. In this example the blower 78, draws the air through the rear 24 (see arrows 94), into an optional second filter 82, then into the second air channel 30 (see arrows 98) and out the second exit filters 86 (see arrows 102), and optional out optional second side exit filters 90 (see arrows 106).

The air filtration apparatus 10 is advantageous for many reasons, including the fact that it contains two separate blower or fans 38, 78, and two separate air flows, one through the first air channel 26, and one through the second air channel 30, along with filters associated with each of the separate air flows. This configuration of having two separate air flows in one air filtration apparatus 10 allows for the cleaning of more air, increased air exchanges and greater overall filtration coverage and efficiency, with a greater reduction or particulates and contaminants by the air filtration apparatus 10 as compared to known air purification units. The better results of the disclosed air filtration apparatus 10 is due to the use of separate grade filters combinations with the varying power of the blowers.

In one embodiment, filters 46 and 50 may be HEPA filters, rated at about 99.97%, which means they will remove particles from the air, which are greater than about 0.3 microns. The first blower 38 will be rated to be able to move the air through these filters and maintain an air velocity in an air stream that will move the air throughout the room that the air filtration apparatus 10 is located in, and then be drawn back through the air intakes of the air filtration apparatus 10 located on generally on the bottom 22 of the enclosure. In this example, the blower may be of an about 800 to about 1200 CFM rating, and may be of a blower design. Some additional blowers 38 that may be used are shown in the attached ebmpapst 2006 catalog pages attached as Appendix 1. Also, additional blowers 38 that may be used are shown in the attached ebmpapst 2003 catalog pages attached as Appendix 2. This air stream will result in the air being repeatedly filtered as long as the blower 38 is running. On the other hand, the second exit filters 86, 90 may be of HEPA grade, from about 85% to about 99.975%, with a different size or capacity blower 78, Some additional blowers 78 that may be used are shown in the attached ebmpapst 2006 catalog pages attached as Appendix 1. The filters 86, 90, in this example, may be a reduced graded HEPA of about 95% or an ASHRE rated filter of 8. The 95% HEPA remove particulates greater than about 5.0 microns and the ASHRE of approximately 10 microns. The use of an about 95% HEPA or the ASHRE will result in the filter allowing more air to move through it and will create less backpressure. This will result in the air exiting the air filtration device 10 as a second air stream, which will have greater velocity than the first air stream and will create a larger circulation path of air, which can reach further into a larger room. In this example we may use an ASHRE filters at 86, 90 that are rated MERV 8-9. These filters may also be impregnated with carbon. In this example we may not have a second filter at the top, or we can have a HEPA filter at the top. The second air stream may only have the ASHRE grade filter.

Figure 2:
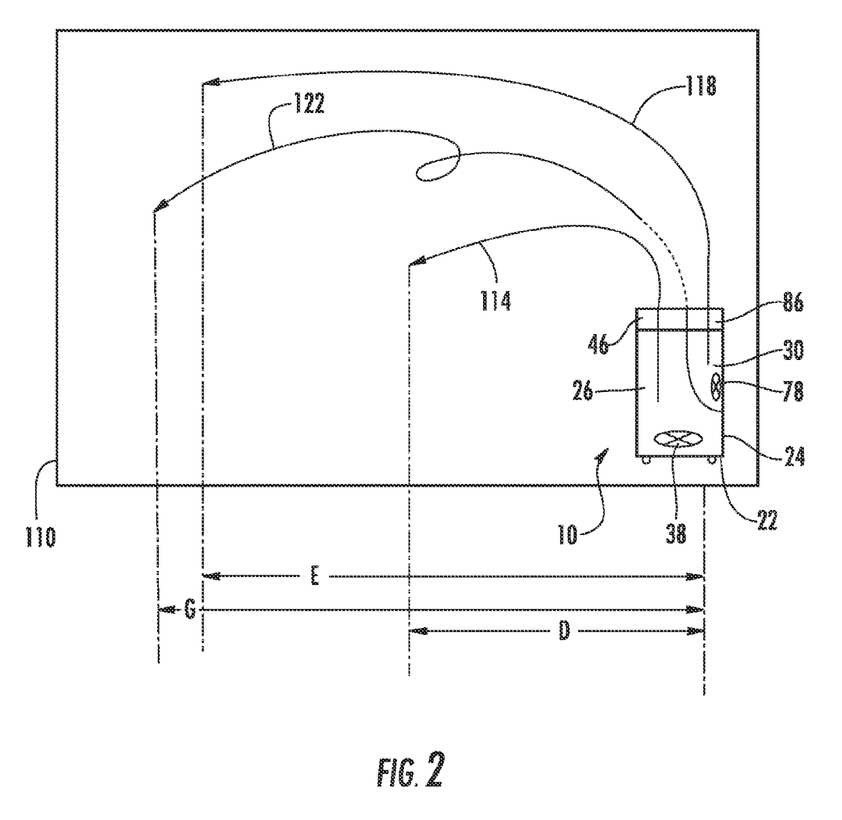
FIG. 2 is a schematic view of the disclosed air filtration and air purification apparatus in a room.

FIG. 2 shows the air filtration apparatus 10 located in a generally enclosed room 110. The first air stream 114 travels from the bottom 22 of the enclosure through the first blower 38, into the first air channel 26, and exits through the first exit filter 46. A second air stream 118 travels from the rear 24 of the enclosure, through the second blower 78, through the second air channel 30, and exits the second air filter 86. The first exit filter 46 has a HEPA filter of about 99.97%, and the second exit fitter 86 has a lesser HEPA filter of between about 85 and about 95%. The second filter 86 may also be a rated ASHRE filter. The second air stream, which is filtered by the second exit fitter 86, will have less backpressure and will have increased velocity, resulting in greater room coverage. As a result of the greater filtering done by the first exit filter 46, the first air stream as shown by arrow 114) may reach a distance D in the room. Due to the lesser filtering done by the second exit filter 86, the second air stream (represented by arrow 118) may reach distance E in the room. In addition, as some of the first airstream 114 and the second air stream 118 combine, a third airstream 122 is formed, and due to the additive nature of the air velocities of the first and second airstreams, the third airstream 122 may reach a distance in the room. G is greater than E, and E is greater than D. The first air stream 114 is activated when the first blower 38 is running. The second air stream 118 is activated when the second blower 78 is running. The first and second airstreams 114, 118 may run at the same time or independently. If only one of the first or second air streams 114, 118 are activated, then generally there will be no third air stream 122.

An advantage of the disclosed air filtration apparatus is that both air streams 114, 118, may be operated together or separately, and if operated at the same time, then an additional third air stream 122 may be created. By running the first and second air streams together they will increase the air exchanges in the room or the environment. The air filtration apparatus wilt not generally compromise the filtration effectiveness due to the continuous or periodic filtration of the air through both the about 99.97% and about 95% filters. The disclosed air filtration apparatus may operate the air streams separately, which if the first air stream 114 is activated, then the about 99.97% HEPA is running independently it will remove all particulates greater than about 0.3 microns.

Another advantage of the disclosed air filtration apparatus is that the second air stream 118 has generally a greater velocity than the first air stream 114. The second air stream 118 can carry along with it the air from the first air stream 114 as it exits the first exit air filter 46 (in one embodiment a 99.97% HEPA filter, along with it to further points in the room or environment, therefore increasing the overall air mixture and turbulence in the room, causing greater mixing of the air in the room, which air travels back to the air filtration device to be continually or periodically filtered through both or either filters 46, 86.

A still other advantage of the disclosed air filtration device is that the two air streams 114, 118 may be integrated to better perform in light, medium or heavily contaminated environments by using the separate first and second air blowers 38, 78 either separately or in tandem to regulate the overall effectiveness of the filtering. In one example, the disclosed air filtration device is capable of running the two air blowers 38, 78 either separately, or in combination during the startup of the room filtering process.

A still other advantage to the disclosed air unit is its ability to operate solely on the rear or second air purification air stream, is that this system may run independently, using a filter less than a HEPA, possibly a ASHRE rated 8, which may run with a smaller motor and at a desired speed, to operate for longer periods of time or at such times at nighttime. This will allow the overall system to maintain a certain desired level of filtration, will remove such items as pollen, allergens, smoke and particulates. This will keep the environment more stable, cleaner and at certain level of clean, without being totally off or have to rely on the more expensive operating HEPA system.

Figure 3:
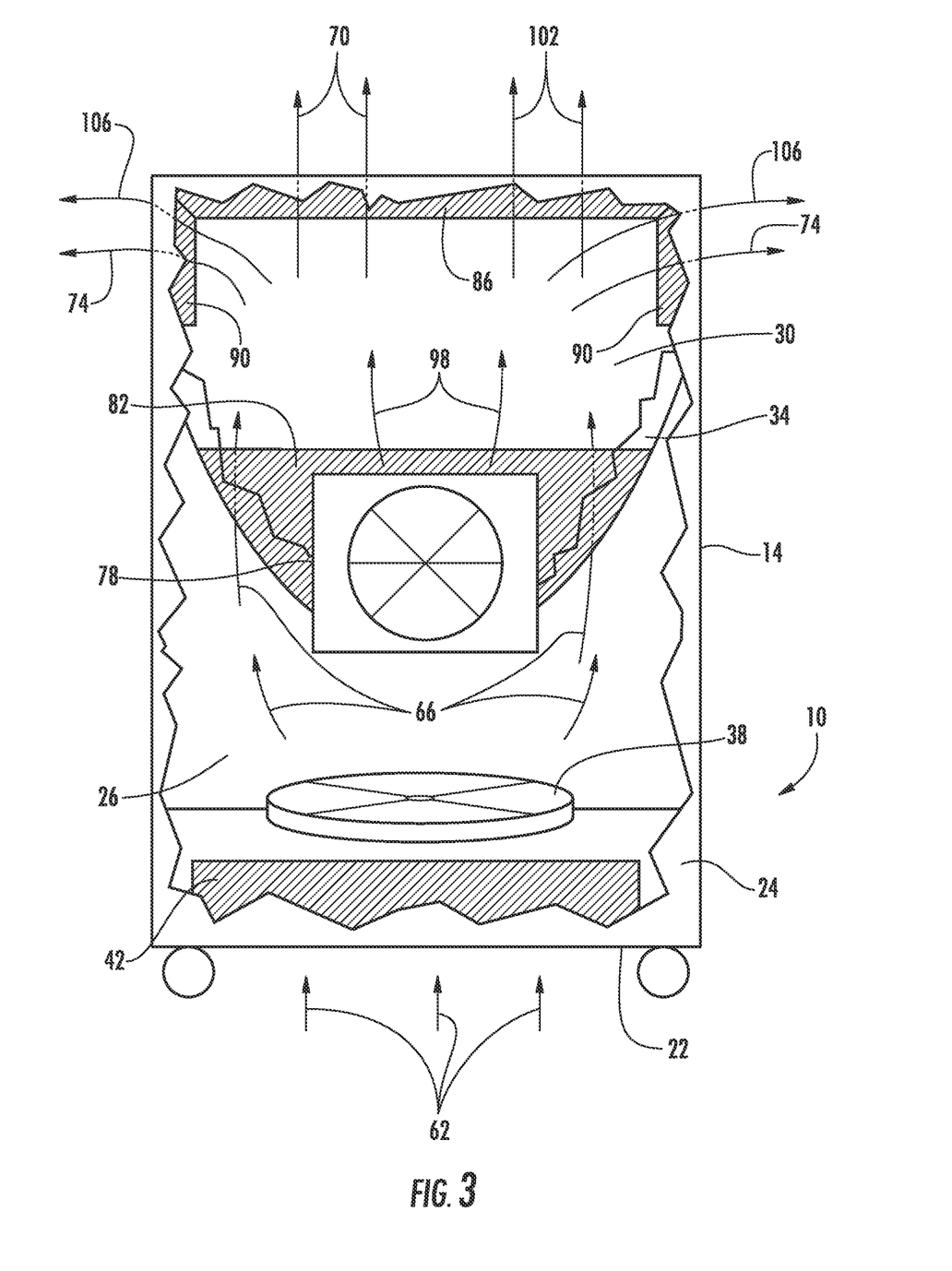
FIG. 3 is a cut-away rear view of the disclosed air filtration and air purification apparatus.

FIG. 3 shows a rear view of the air filtration apparatus 10, with the rear 24 of the enclosure generally cut away, and the divider 34 also generally cut away in order to show more clearly the interior of the apparatus 10. As shown in this view, the second blower 78 may be attached to the rear 24 of the enclosure 14.

Figure 4:
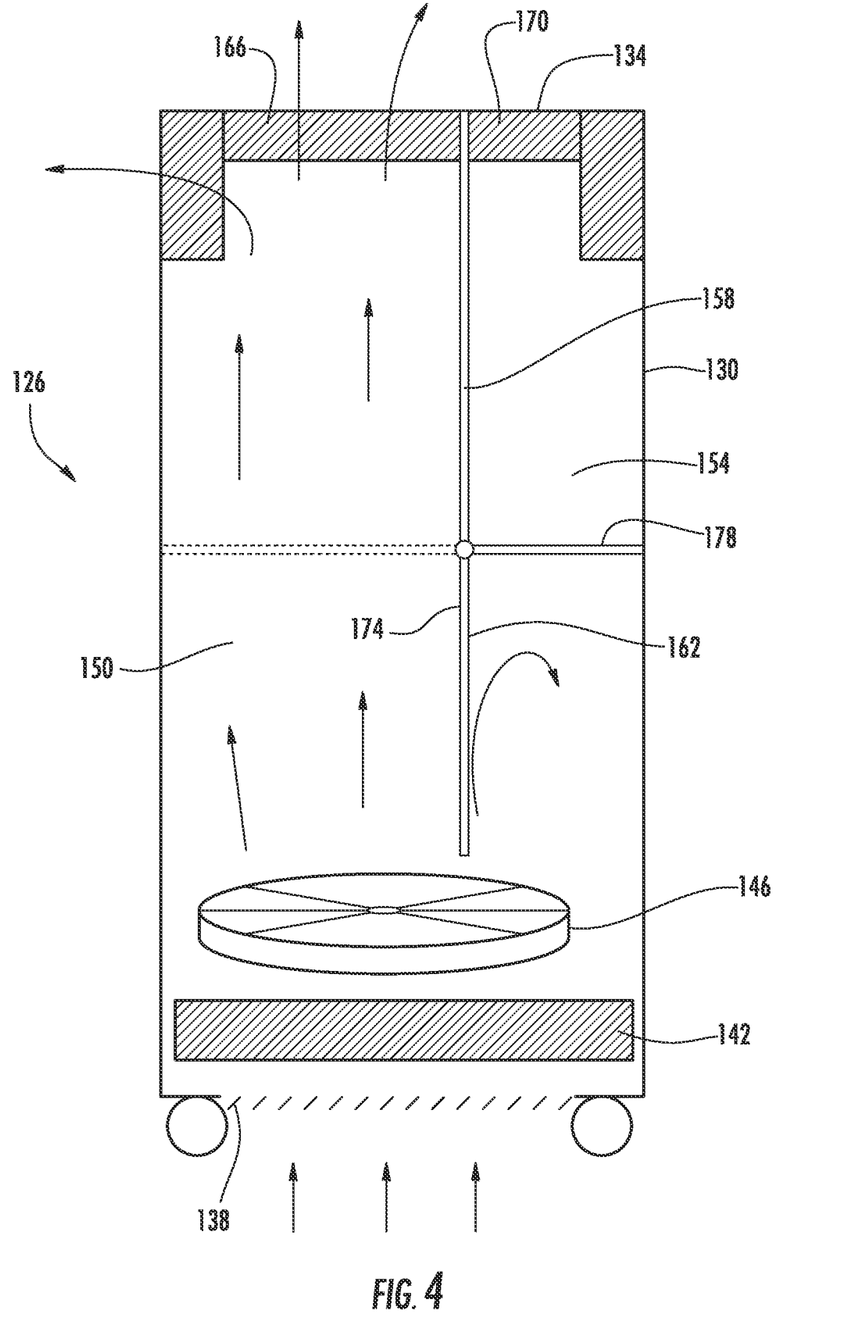
FIG. 4 is generally a cross-sectional view of another embodiment of the disclosed air filtration and air purification apparatus.
Figure 5:
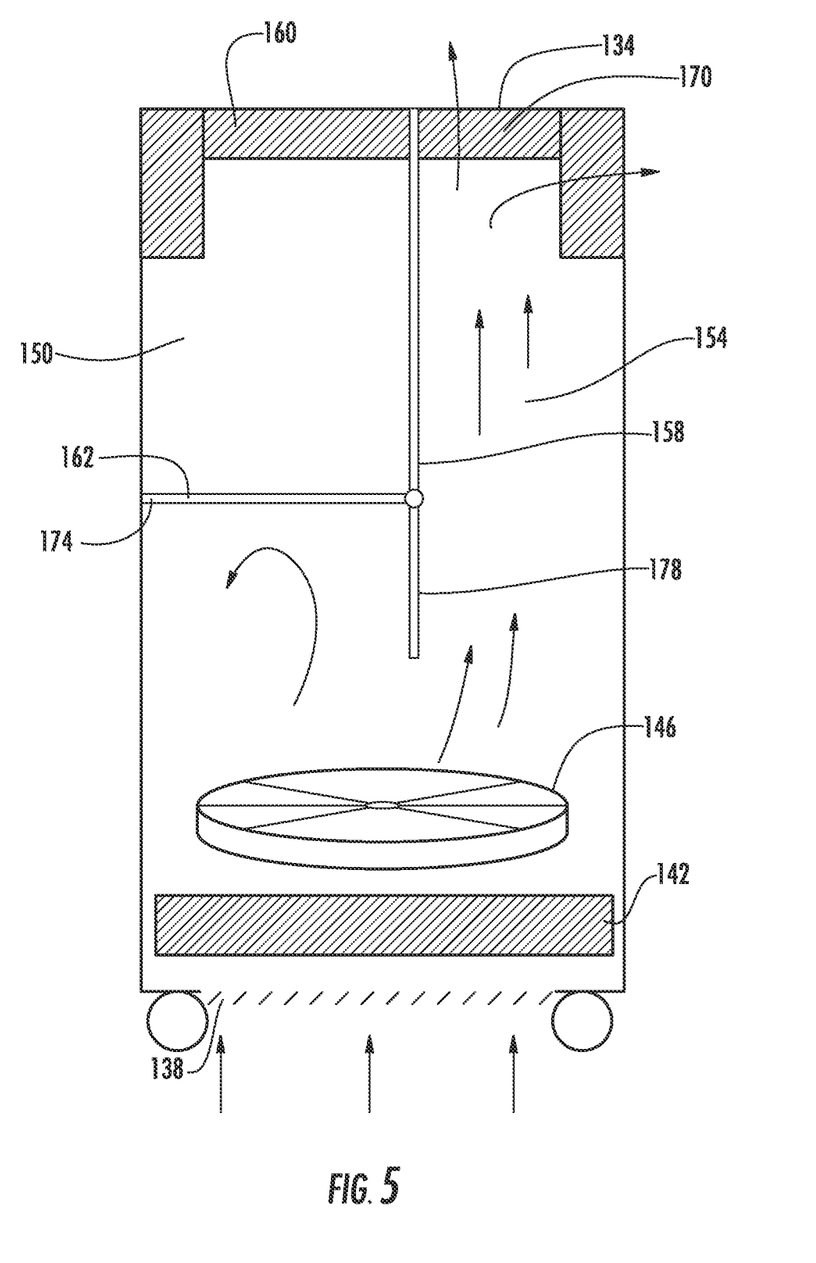
FIG. 5 is a the device from FIG. 4, with the first and second members rotated.
Figure 6:
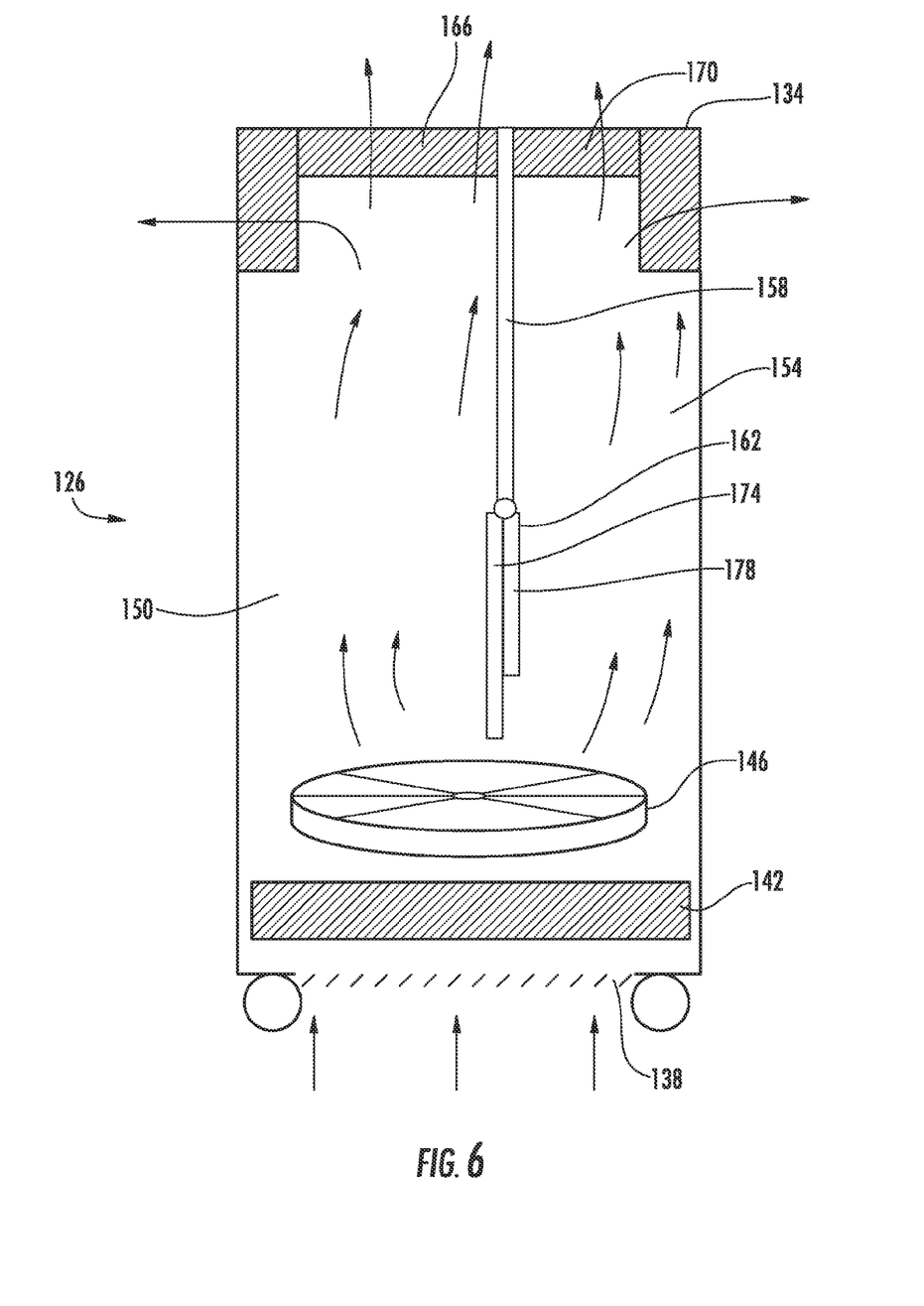
FIG. 6 is the device from FIG. 4, with the first and second members positioned so as to not the block the flow of air.

FIG. 4 shows another embodiment of a disclosed air filtration apparatus 126. The air filtration comprises an enclosure 130, with a top 134, and a bottom 138. An optional filter 142 may be located at near the bottom 138. In this embodiment, there is only one blower 146. There are two air channels, a first air channel 150 and a second air channel 154. There is a divider 158 that separates the first air channel 150 from the second air channel 154. In addition, there is a rotatable damper 162 that controls how air from the blower travels either to the first air channel 150, or second air channel 154, or both. In the shown configuration, the damper 162 is positioned so that air from the blower travels through the first air channel 150 and out the first exit filters 166. In this embodiment, the air damper 162 comprises a first member 174 and a second member 178 that is generally orthogonal to the first member 174. The first member 174 is positioned so it does not impede the flow of air through the first air channel 150, but the second member 178 is positioned to generally block air from entering the second air channel 154 and out the second exit filters 170. Some additional blowers 146 that may be used are shown in the attached Appendixes 1 and 2. Some rated filters that may be used are listed in Appendix 3, especially those filters rated efficiencies of about 8 to about 17. In one embodiment, the first member 174 is fixed with respect to the second member 178. Thus when the damper 162 rotates into the position shown in FIG. 5, the first air channel 1150 is closed, and the second air channel 154 has air flow from the blower 146 through the second exit filters 170. In still another embodiment, the first and second members 1174, 178 may be rotatable with respect to each other, so that the damper 162 can be arranged in the orientations shown in FIGS. 4, 5, and 6. FIG. 6 shows both the first and second members rotated such that the air from the blower 146 can travel through both the first and second air channels 150, 154 and out both sets of exit filters 166, 170.

Figure 7:
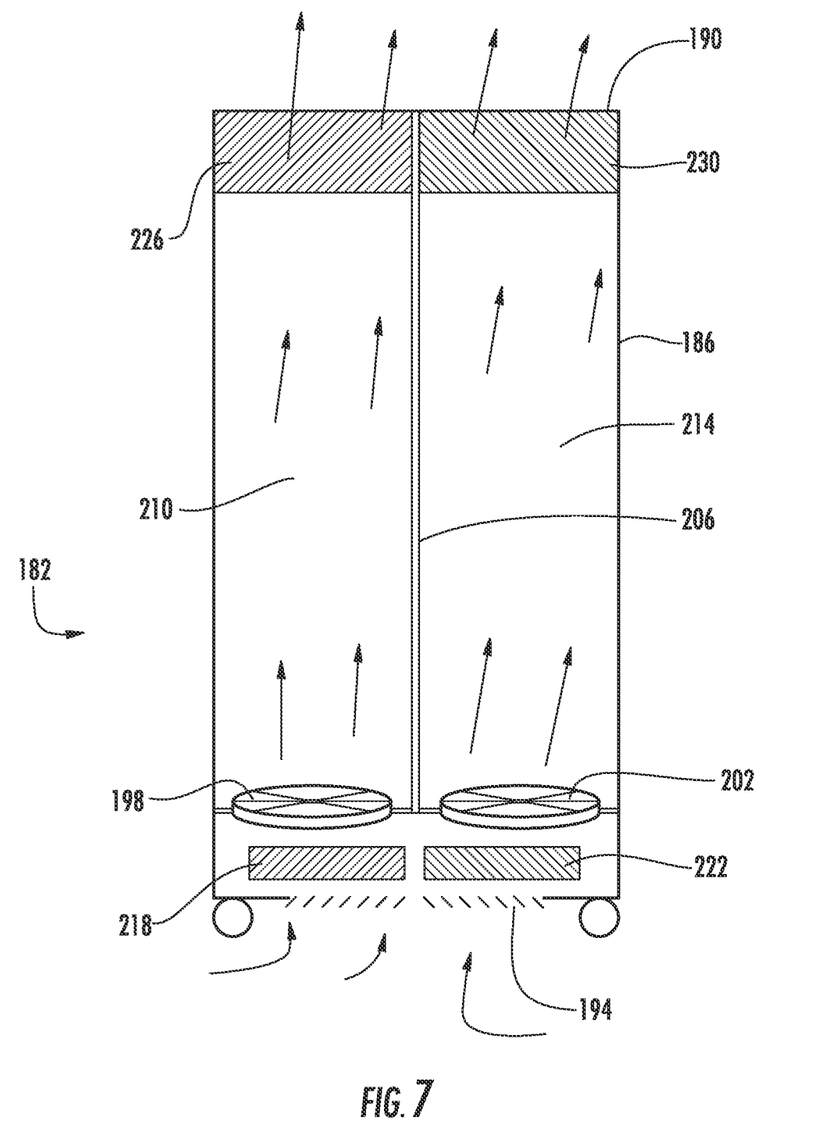
FIG. 7 a cross-sectional view of another embodiment of the disclosed air filtration and air purification apparatus.

FIG. 7 shows another embodiment of the disclosed air filtration apparatus 182. In this embodiment, the apparatus comprises a housing 186, with a top 190, and bottom 194. Near the bottom are a first air blower 198 and a second air blower 202. A divider 206 divides the interior of the housing 186 into a first air channel 210 and a second air channel 214. An optional first filter 218 and second filter 222 may be located between the first and second air blowers 198, 202 (respectively) and the bottom 194 of the enclosure. In other embodiments, the first pre-filter 218 and second pre-fitter 222 may be combined into one larger pre-filter that filters the air going to both the first and second blowers 198, 202. Near the top of the 190 of the enclosure, there is a first exit filter 226 and second exit filter 230. The first exit filter 226 may be a HEPA filter of about 99.97%, and the second exit filter 230 may be a HEPA filter of between about 85% and about 95%. Similarly to the embodiment shown in FIG. 1, the blowers 198, 202, may be operated at the same time, or alternatively with one and other, in order to form the air streams shown in FIG. 2. Some additional blowers 146 that may be used are shown in the attached Appendixes 1 and 2. Some rated filters that may be used are listed in Appendix 3, especially those filters rated efficiencies of about 8 to about 17.

Figure 8:
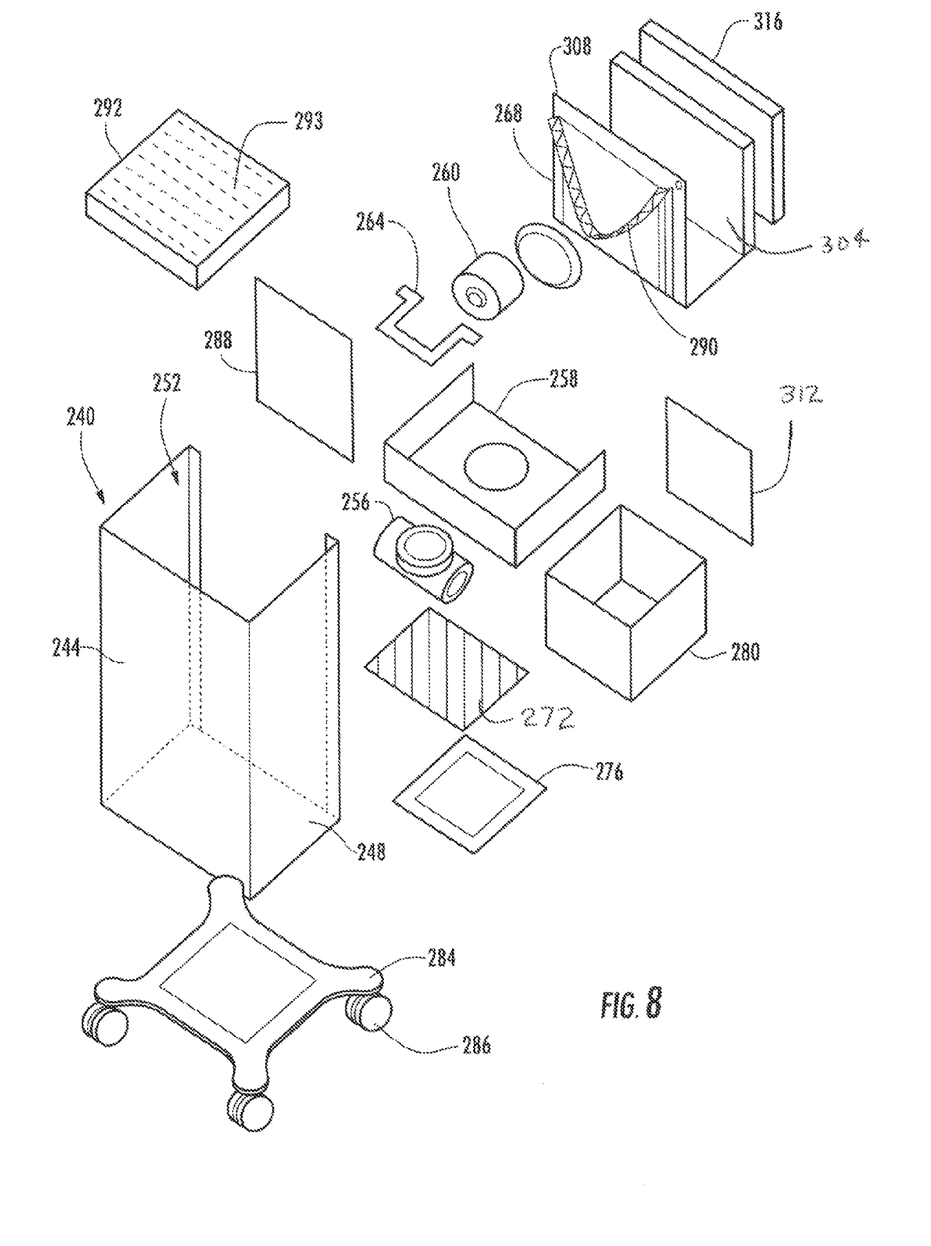
FIG. 8 is an exploded view of another embodiment of the disclosed air filtration and air purification apparatus.

FIG. 8 shows an exploded view of another embodiment of the disclosed air filtration apparatus 240. The enclosure comprises a panel 244, containing a first side portion 248, and a second side portion 252. A bases 284 and wheels 286. A first blower 256 is shown, as is a second blower/impeller 260. There is a motor bracket 264, a ring 268, and a second motor mount 272. There is a first filter holder 276, and at least one first filter 280. A base plate 284 is shown near the bottom. A first motor mount 258 is shown for first blower 256. A plenum 288 and an air deflector 290, is also shown. Also seen is a top grill 292, with air fins 293, a filter 304, and a filter holding box 308, a rear cover panel 312, and a rear filter door 312.

Figure 9:
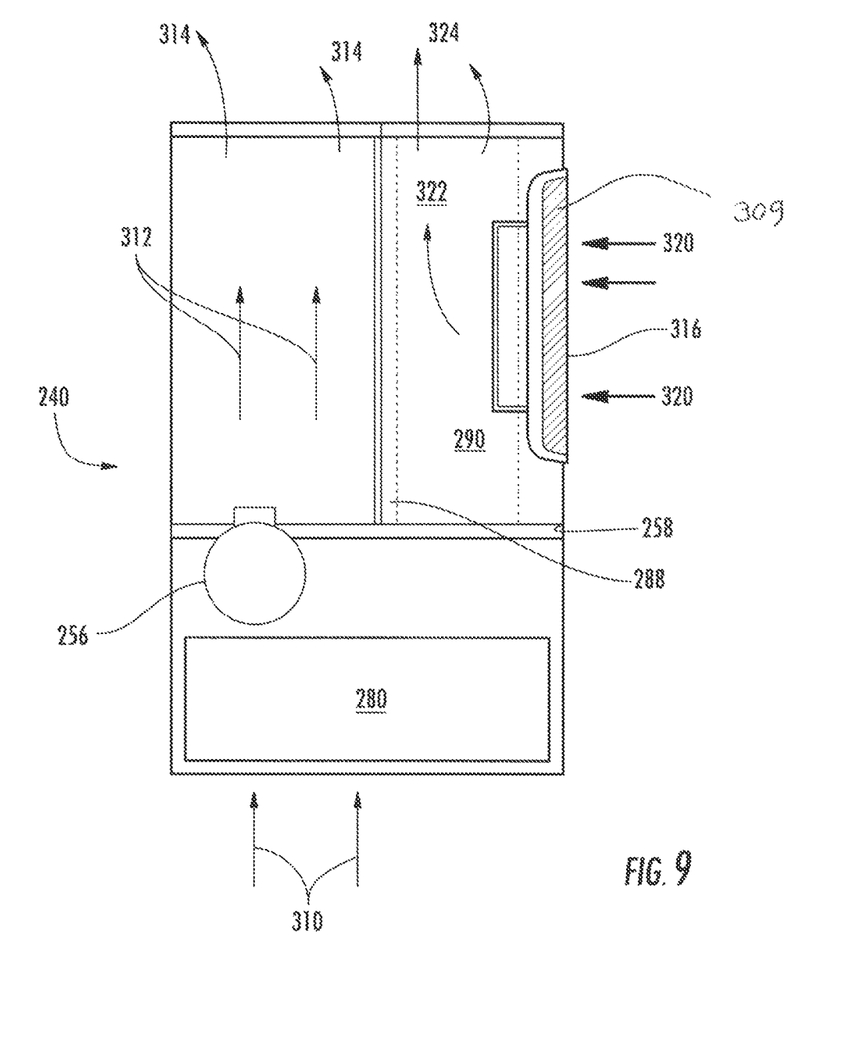
FIG. 9 is a sectional view of the disclosed air filtration and air purification apparatus.

FIG. 9 is a sectional view of the air filtration apparatus 240. This sectional view FIG. 9 has generally the components of FIG. 8 fully assembled. When fully assembled the first air channel and second air channels are formed. The first blower 256 and second blower 260 are visible in these figures. The first blower 256 will draw the air, as shown by the arrows 310, from the ambient environment, and draw the air 310 through the first filter 280, the air will then move through the blower 256 and be expelled into the air channel shown by arrows 312 then out the top of the unit shown by arrows 314. The second blower 260 draws air from the ambient environment, shown as arrows 320, through the second filter 309, through the second blower 260 and expelled into the second air channel 322 and out through the top, as shown by arrows 324. Air deflector 290, shown in dotted lines, is seen through to expose bower 260, and directs the air up through the top grate 292. In this example filter 280 contains a HEPA rated at 99.97 and an ASHRE filter 309, with an MERV rating of 8.

A still other advantage of the disclosed air filtration device is that the two air streams 312 and 322, and two separate systems is the ability of the invention to create two separate channels for Air Exchanges per Hour (AEH). When both air systems are running at full capacity the air purification unit can exchange the air 20 to 30 times per hour when known units can exchange the air only 5 to 10 times per hour. This will result in a shorter cleaning time, more effective filtration, and the ability to clean more air per hour, resulting in much cleaner and stable environment.

In one embodiment, the apparatus of FIG. 9 may have the following specifications. However, one of ordinary skill will recognize this is only one example, and other specifications are included in the scope of this disclosure. Thus, the device of FIG. 9 may have a blower motor 256, with a CFM rating of 600 CFM's, with the filters in place, and an impeller motor 260, with a CFM rating of 400 GM's with the filters in place. For this example it will be assumed that a known air purification unit is rated 500 CFM's, with filters in place. Using a room size of 20 feet, by 20 feet, by 8 feet in height, the room would be 3,200 cubic feet. The known unit can perform 9 Air Exchanges per Hour (AEH) exchange the air. The invention with both blower and impeller filter systems running at the same time will produce 1100 CFM's. The invention will exchange the air 20 AEH. This will surpass all current known units in the marketplace today, be twice as effective and economical.

This invention relates to the improvement made to an environmental air filtration and purification device. The inventions uses unique combinations of motors and fans, along with certain air flow techniques and multiple fitters to more effectively clean the air within an environment.

One embodiment of the invention is an air purification unit, which will be portable and will be placed within the environment. The invention may be used in units, which are placed inside the environment, outside overall environment, such as a rooftop HVAC system or a unit, which are places along side of the environment to be filtered. This alongside unit may be used to introduce filtered air into the environment o force in clean air but to also increase the positive pressure within the environment, both may also draw the air out of the environment and then fitter it, and the put the clean air back into this same environment, thereby consistently cleaning and restyling the air.

The invention may be a combination of filters and at least two air channels in the device to provide several separate airflows, air velocities and air exchanges.

One example of the invention is to have a combination of motors and filters, which will create separate airflows within the environment. In this example the device is a self-contained air purification unit, such as box. There is a first air system, which has a motor, a HEPA filter of 99.97% and its own channel, or plenum inside. There is a second air system, alongside, which has its own motor, its own filter and channel or plenum. In this example the second system has a HEPA filter rated less than about 99.99% down to an ASHRE filter with a MERV rating of about 8.

The invention is much more effective, by creating a better and more effective airstream and is able to circulate the air quicker and more effectively, increasing air exchanges and the overall filtration of the environment.

The disclosed invention may use the 99.97% HEPA and the 95% HEPA filters. The use of a 95% HEPA filter will not compromise the quality that will be achieved had only a 99.97% HEPA filter been used. The air in the room will circulate through both systems, therefore going through the 99.97% HEPA at some time during the air purification process.

The invention may include a direct, semi-manual, manual, or electronic system of controls. The control system may consist of turn knobs and may include a keypad. The control system will control whether one or more blowers are operating at the same time, how the damper is oriented, how long the blower(s) operate, and how long a first air stream or second air stream is generated. In one example of use, the first airstream with the 99.97% HEPA filter will generate. The second airstream with the 95% HEPA filter will also be generated. Both airstreams will be filtering the room. The second airstream will have a greater velocity than the first airstream, and thus the second airstream will reach further points within the room and will carry the air of the first airstream.

A second example of how to use the invention is when only the first airstream is generated. During this time all the air being filtered will be filtered through the 99.97% HEPA filter and therefore all the air will be cleaned of particulates down to 0.3 microns.

A third example of how to use the invention is when only the second airstream is generated, which uses the 95% HEPA filter. This airstream has a greater air velocity, remains more quite than when the first airstream is being generated, but stilt maintains a clean air environment.

An advantage of the invention is that the airstreams may be integrated to better perform in tight, medium or heavily contaminated environments by using each airstream together or separately, at different speeds at differing effectiveness, and each airstream may be generated for varying intervals of time.

The invention will allow the use of various or different size and power rated motors or blowers to better match the fitters being used and the overall desired filtration levels, creating better efficiency and energy conservation.

The invention can allow for the separate use of the motors or blowers and the filter system, which will reduce the electricity used by the invention and accordingly save money for the users.

The invention may have a second embodiment of using separate filters, air channels, plenums and airflow, white using a single motor or fan to create the airflow. This device uses a single fan or motor with a system of diverting the airflow, towards the separate filter or channel or plenums. The device includes a method to alter the airflow through the device and the various fitters and filter combinations.

This invention relates to the improvement of filtering the overall air in an environment and or a laboratory or room. The invention will improve the airflow, the velocity of the air and an improved &vice for air filtration and purification.

The invention consists of a specially designed device, which may be made of either a polymer or a metal material or a combination of both. The invention consists of multiple adjoining parts, concisely designed to fit easily and correctly, to create a device for air movement and filtration. The invention may be used in multiple configurations.

The invention will include HEPA grade filters and lesser grade filters as filters and such. The placement of the various types of filter grades will allow the device to create separate air paths and air exchanges, resulting in an improved means of filtering the desired laboratory, room, house or building environment.

The invention will allow greater filtration capacity with smaller more effective devices. The device may filter the air in much larger environments than current devices of the same time.

The invention will have the unique ability to greatly increase the air exchange per hour, by having dual air filtration systems operating at the same time. The invention can increase the air exchanges in the environment to over two times of a known air purification system.

The invention will allow the air filtration system to outperform known units in the number of air exchanges per hour. In comparison, the known system will exchange the air per hour in the range of 5 to 10 times per hour, our invention will be able to air exchange per hours at a rate of 10 to 20 times per hour for the same sized space.

Other advantages of the invention may include: the invention may improves the handling, filtration and purification of the air within a particular environment; exchange the air more times per hour than currently known devices; will be at least as effective as known devices but will save energy as compared to known devices.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. An air filtration and air purification apparatus comprising:
    an enclosure, the enclosure having a top, a bottom, sides and a rear;
    a first air channel located in the enclosure;
    a second air channel located in the enclosure;
    a divider that separates the first air channel from the second air channel;
    a first filter located in first air channel, and in direct fluid communication with the first air channel;
    a second filter located in the second air channel, and in direct fluid communication with the second air channel, wherein the first filter has a higher HEPA class than the second filter;
    a first air blower configured to pull air from the ambient environment generally into the first air channel, moving said air through the first filter, and returning said air into the ambient environment, creating generally a first air stream;
    a second air blower configured to pull air from the ambient environment generally into the second air channel, moving said air through the second filter and returning said air into the ambient environment, creating generally a second air stream;
    a control system that controls the activation and deactivation of the first and second air blower, such that the control system is configured to operate the blowers independently or together; and
    wherein the first filter is a HEPA filter with a MERV rating of about 17, and is filter rated at about 99.97%, and the second filter has a MERV from about 17 to about 4.

2. The air filtration and air purification apparatus of claim 1, wherein the control system is configured to operate in at least three operating modes: a first operating mode such that the first air blower is running simultaneously with the second air blower; a second operating mode such that the first air blower is running while the second air blower is not running; and a third operating mode such that the second air blower is running while the first air blower is not running.

3. The air filtration and air purification apparatus of claim 1, wherein the first blower and second blower are each configured to move about the same amount of air as the other blower, measured in cubic feet per minute.

4. The air filtration and air purification apparatus of claim 1, wherein the first blower and second blower may be each configured to move different amounts of air as the other blower, measured in cubic feet per minute.

5. A portable air filtration and air purification apparatus comprising:
    an enclosure, the enclosure having a top, a bottom, and a rear;
    a first air channel located in the enclosure;
    a second air channel located in the enclosure;
    a divider that separates the first air channel from the second air channel;
    a first filter in direct fluid communication with the first air channel;
    a second filter in direct fluid communication with the second air channel, wherein the first filter has a higher HEPA class than the second filter;
    a first air blower configured to pull air from the ambient environment generally into the first air channel, and out through the first filter into the ambient environment, creating generally a first air stream;
    a second air blower configured to pull air from the ambient environment generally into the second air channel, and through the second filter and then into the ambient environment, creating generally a second air stream;

a control system that controls the activation and deactivation of the first and second air blower, such that the control system is configured to operate the blowers independently or together; and wherein the first filter is a HEPA class filter rated at about 99.975%, and the second filter is a HEPA class filter rated at about 95%.

6. The air filtration and air purification apparatus of claim 5, a control system that controls the activation and deactivation of the first and second air blower, such that the control system is configured to operate in at two operating modes: a first operating mode such that the first air blower is running simultaneously with the second air blower; a second operating mode such that the first air blower and second blower is running independent of each other.

7. The air filtration and air purification apparatus of claim 5, wherein the control system controls the activation and deactivation of the first and second air blower, such that the control system is configured to operate the blowers independently or together.

8. The air filtration and air purification apparatus of claim 5, wherein the first blower and second blower are each configured to move about the same amount of air as the other blower, measured in cubic feet per minute.

9. The air filtration and air purification apparatus of claim 5, wherein the first blower and second blower may be each configured to move different amounts of air as the other blower, measured in cubic feet per minute.

10. The portable air filtration and air purification apparatus of claim 5, wherein the first air blower is generally attached to the bottom of the enclosure, and the first air channel extends generally from the first air blower to the first air filter; and wherein the second air blower is generally attached to the rear of the enclosure, and is located further from the bottom of the enclosure than the first air blower, and the second air channel extends generally from the second air blower to the second air filter.

11. The portable air filtration and air purification apparatus of claim 5, wherein the first air blower is generally attached to the bottom of the enclosure, and the first air channel extends generally from the first air blower to the first air filter; and wherein the second air blower is generally attached to the bottom of the enclosure, and the second air channel extends generally from the second air blower to the second air filter.

12. The portable air filtration and air purification apparatus of claim 5, further comprising:

a first pre-filter located such that the air that is pulled into the first air blower is filtered by the first pre-filter; and a second pre-filter located such that the air that is pulled into the second air blower is filtered by the second pre-filter.

\* \* \* \* \*